Dec. 16, 1924.
T. WILSON
VALVE STEM PACKING
Filed May 23, 1924
1,519,571
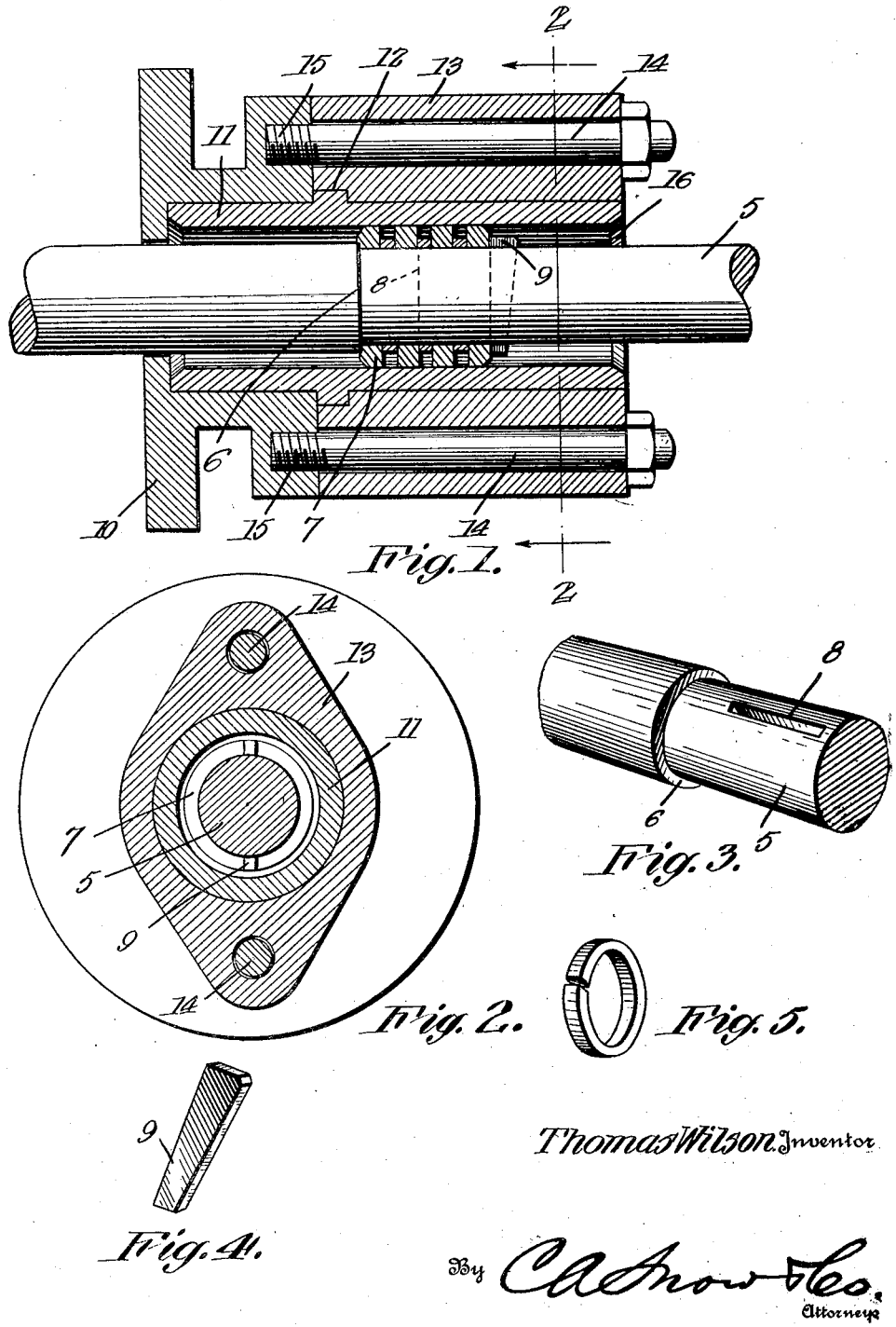
Thomas Wilson, Inventor
By C.A.Snow&Co.
Attorneys Patented Dec. 16, 1924.

1,519,571

UNITED STATES PATENT OFFICE.

THOMAS WILSON, OF MINDEN, LOUISIANA, ASSIGNOR TO THE MINDEN VALVE STEM PACKING COMPANY, INC., OF MINDEN, LOUISIANA.

VALVE-STEM PACKING.

Application filed May 23, 1924. Serial No. 715,411.

*To all whom it may concern:*

Be it known that I, THOMAS WILSON, a citizen of the United States, residing at Minden, in the parish of Webster and State of Louisiana, have invented a new and useful Valve-Stem Packing, of which the following is a specification.

This invention relates to valve stem packing, and aims to provide novel means to insure against movement of the valve stem and packing carried thereby independently of the valve sleeve in which the packing operates.

Another object of the invention is to provide improved means for securing the packing rings to the valve stem in a manner to eliminate any possibility of the rings moving longitudinally of the valve stem on which they are positioned.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is a longitudinal sectional view through a stuffing box disclosing a valve stem as operating therethrough.

Figure 2 is a sectional view taken on line 2—2 of Figure 1.

Figure 3 is a fragmental perspective view disclosing the valve stem.

Figure 4 is a perspective view of the key employed for securing the packing rings to the valve stem.

Figure 5 is a perspective view of one of the packing rings.

Referring to the drawing in detail, the reference character 5 indicates a valve stem which is provided with an enlargement defining a shoulder 6 against which the packing rings are held, the packing rings being indicated at 7.

The valve stem is provided with a transversely disposed opening 8 which has an inclined wall adapted to engage an inclined edge of the key 9 that in operation is disposed within the opening, the key contacting with one of the packing members to force them to their active positions on the valve stem 5.

The reference character 10 illustrates the stuffing box in which one end of the sleeve 11 is positioned, the sleeve being provided with a circumferential rib 12 adapted to engage one edge of the stuffing box 10 to restrict movement of the sleeve within the stuffing box.

Forming a part of the stuffing box is a removable member 13 which is provided with an offset portion disposed adjacent to one end thereof, which offset portion accommodates the circumferential rib of the sleeve 11 to prevent movement of the sleeve away from the member 10.

Studs 14 extend through openings in the removable member 13 and have their threaded ends 15 positioned in suitable threaded openings in the member 10, whereupon the member 13 may be securely held in position and the sleeve 11 locked against movement, longitudinally of the valve stem 5. In order that the packing rings when positioned on the valve stem 5 may be readily inserted in the sleeve, the inner edges of the sleeve at points adjacent to the ends thereof, are beveled as at 16 providing a clearance for the rings, when entering the sleeve.

In the use of the device, suitable packing rings are positioned on the valve stem and moved into engagement with the shoulder 6. The key is now driven into the opening 8 with the result that a wedging action is set up between the key and rings to force the rings against the shoulder 6 and insure against movement of the rings independently of the valve stem 5.

The valve stem together with the packing is now positioned in the sleeve 11, and it will be obvious that due to the manner of supporting the sleeve, the sleeve will be held securely against movement when the valve stem is in operation.

I claim:—

In a device of the character described, a stuffing box, a sleeve in the stuffing box, a removable member for engaging the sleeve to hold the sleeve in position, a valve stem operating through the sleeve, packing rings on the valve stem, said valve stem having a shoulder to be engaged by the packing rings to restrict movement of the packing rings with respect to the valve stem, and a key extending through the valve stem for moving the packing rings into engagement with the shoulder.

In testimony that I claim the foregoing as my own, I have hereto affixed my signature in the presence of two witnesses.

THOMAS WILSON.

Witnesses:
D. W. LAWHON,
J. BENNETT JOHNSON.